United States Patent
Zelenov et al.

(10) Patent No.: US 10,380,195 B1
(45) Date of Patent: Aug. 13, 2019

(54) GROUPING DOCUMENTS BY CONTENT SIMILARITY

(71) Applicant: Parallels International GmbH, Schaffhausen (CH)

(72) Inventors: Anton Zelenov, Moscow (RU); Nikolay Dobrovolskiy, Moscow (RU); Serguei M. Beloussov, Singapore (SG)

(73) Assignee: Parallels International GmbH, Schaffhausen (CH)

(*) Notice: Subject to any disclaimer, the term of this patent is extended or adjusted under 35 U.S.C. 154(b) by 216 days.

(21) Appl. No.: 15/405,442

(22) Filed: Jan. 13, 2017

(51) Int. Cl.
*G06F 17/30* (2006.01)
*G06F 16/93* (2019.01)
*G06F 17/27* (2006.01)
*G06F 17/21* (2006.01)
*G06F 16/28* (2019.01)
*G06F 16/951* (2019.01)
*G06F 16/2457* (2019.01)

(52) U.S. Cl.
CPC ........ *G06F 16/93* (2019.01); *G06F 16/24578* (2019.01); *G06F 16/285* (2019.01); *G06F 16/951* (2019.01); *G06F 17/211* (2013.01); *G06F 17/2705* (2013.01)

(58) Field of Classification Search
CPC .............................................. G06F 17/30011
See application file for complete search history.

(56) References Cited

U.S. PATENT DOCUMENTS

| 5,909,677 | A  | * | 6/1999 | Broder .............. | G06F 17/3071 |
| 8,788,506 | B1 | * | 7/2014 | Dornbach ......... | G06F 17/30864 |
| | | | | | 707/747 |
| 2003/0033297 | A1 | * | 2/2003 | Ogawa ............. | G06F 17/30622 |
| 2006/0287988 | A1 | * | 12/2006 | Mason ............. | G06F 17/30737 |
| 2012/0060082 | A1 | * | 3/2012 | Edala ................... | G06F 17/241 |
| | | | | | 715/231 |
| 2013/0173610 | A1 | * | 7/2013 | Hu .................... | G06F 17/30864 |
| | | | | | 707/728 |
| 2017/0161375 | A1 | * | 6/2017 | Stoica .............. | G06F 17/30707 |
| 2017/0277809 | A1 | * | 9/2017 | Hatakeyama ..... | G06F 17/30011 |

* cited by examiner

*Primary Examiner* — Hung Q Pham
(74) *Attorney, Agent, or Firm* — Lowenstein Sandler LLP (57) ABSTRACT

Implementations of the disclosure describe grouping documents by content similarity. A method of the disclosure includes determining a first set of document identifiers (IDs) for documents identified responsive to a search query, for each document ID of the first set: obtaining shingles corresponding to the document ID, identifying a second set of document IDs corresponding to the obtained shingles, grouping the identified document IDs of the second set in a grouping data structure, and determining resulting document IDs from the grouping data structure, the resulting document IDs corresponding to a threshold number of the document IDs in the grouping data structure having a highest number of occurrences. The method further includes associating the documents corresponding to the resulting documents IDs with one another in search results generated responsive to the search query.

30 Claims, 6 Drawing Sheets

GROUPING DOCUMENTS BY CONTENT SIMILARITY

TECHNICAL FIELD

Embodiments of this disclosure relate generally to computer systems and, more specifically, relate to grouping documents by content similarity in computer systems.

BACKGROUND

A search engine is a computer system that is configured to search for information, either on a local network or on the Internet. Results of Internet searches can be presented via user interfaces in a list of results that may include lists of web pages, images, documents, or any other types of files. Results for document searches can be presented in a list of results that can include names of documents, storage locations of documents, text strings within documents, or the like. In some cases, search engines can mine data available for searching in databases accessible to the search engine to build an index for improving performance and quality of results. Search engine indexing collects, parses, and stores data to facilitate information retrieval.

BRIEF DESCRIPTION OF THE DRAWINGS

Embodiments of the present disclosure will be understood more fully from the detailed description given below and from the accompanying drawings, which, however, should not be taken to limit the present disclosure to the specific embodiments, but are for explanation and understanding only.

DETAILED DESCRIPTION

Described herein are methods and systems for enabling and implementing grouping documents by content similarity. Search engines may collect information by accessing data from websites, document repositories, etc., and parsing that data to build a search index. Search engines may return a list of documents containing a keyword search term. Additional filters may also be applied by the search engine to narrow the list of documents returned in a search result.

However, while filtering search results may be a useful tool for general document searching, when the list of search results includes a number of similar documents in terms of content (e.g., different versions with minor edits, etc.), such filters are not helpful in narrowing, filtering, or otherwise curating search result documents to be more useful for an end user. As these documents include similar content, the filtering tool may not remove similar documents from search results, which can create a cluttered and repetitive search result. Thus, conventional document search engine implementations may not adequately group documents with similar content together to generate a more useful search result for an end user.

Aspects of the disclosure address the above noted and other deficiencies by providing a document search engine to facilitate grouping documents returned from a search index query by content similarity. In one embodiment, a document search engine application on a server device builds shingles for documents in a document repository (e.g., upon indexing or re-indexing of the documents). A shingle may refer to a contiguous sequence of "n" items (e.g., phonemes, syllables, letters, words, base pairs, etc.) from a given sequence of text or speech. The shingles may be stored in both document metadata for the documents and in a shingles data store. A single entry in document metadata for a document may contain all of the shingles identified within the document. Additionally, a record in the shingles data store may include the shingle and the document identifiers of any documents that include the shingle.

The document search engine may utilize the document metadata and shingles data to group documents by content similarity, based on the shingles information stored in these data stores, in response to search queries of the contents of the documents. For example, in response to a search query, document search engine may identify a list of documents that satisfy the search query. Document search engine may further access document metadata to identify the shingles in the documents that include a string of the search query (e.g., any document whose textual content includes the search query string). Shingles data store may be accessed to identify other documents having the same shingles, and this information is used to group documents having similar content (as indicated by co-occurrence of shingles in the documents) in the search results in response to the search query.

Aspects of the present disclosure are thus capable of providing improved search results by grouping documents by content similarity based on shingles of the documents. Thus, the document search engine can provide search results that are more relevant to the user entering the query, rather than suggestions that are most popular among users of the search engine.

In particular, unlike conventional techniques, the document search engine of the disclosure may build and index shingles for documents upon indexing of the documents, where these shingles are used to identify similar documents that could not be filtered from the search results otherwise. This can provide a significantly more efficient method of generating relevant and useful search results in response to a search query. In addition, the building and indexing of shingles prior to the search query provides a technical advantage of faster and more efficient processing of a search query by a document search engine. For example, the use of a grouping data structure, such as a hashmap container, to group and identify most-frequently occurring shingles between documents in search results improves (e.g., decreases) processing time of a search query. Thus, the document search engine of the disclosure can improve the efficiency and relevancy of generated search results in response to a search query by grouping documents according to content similarity based on shingles of the documents. This reduces the amount of time a user may need to expend on analyzing search results and improves the use of the processing resource(s) used to generate the grouped search results.

Figure 1:
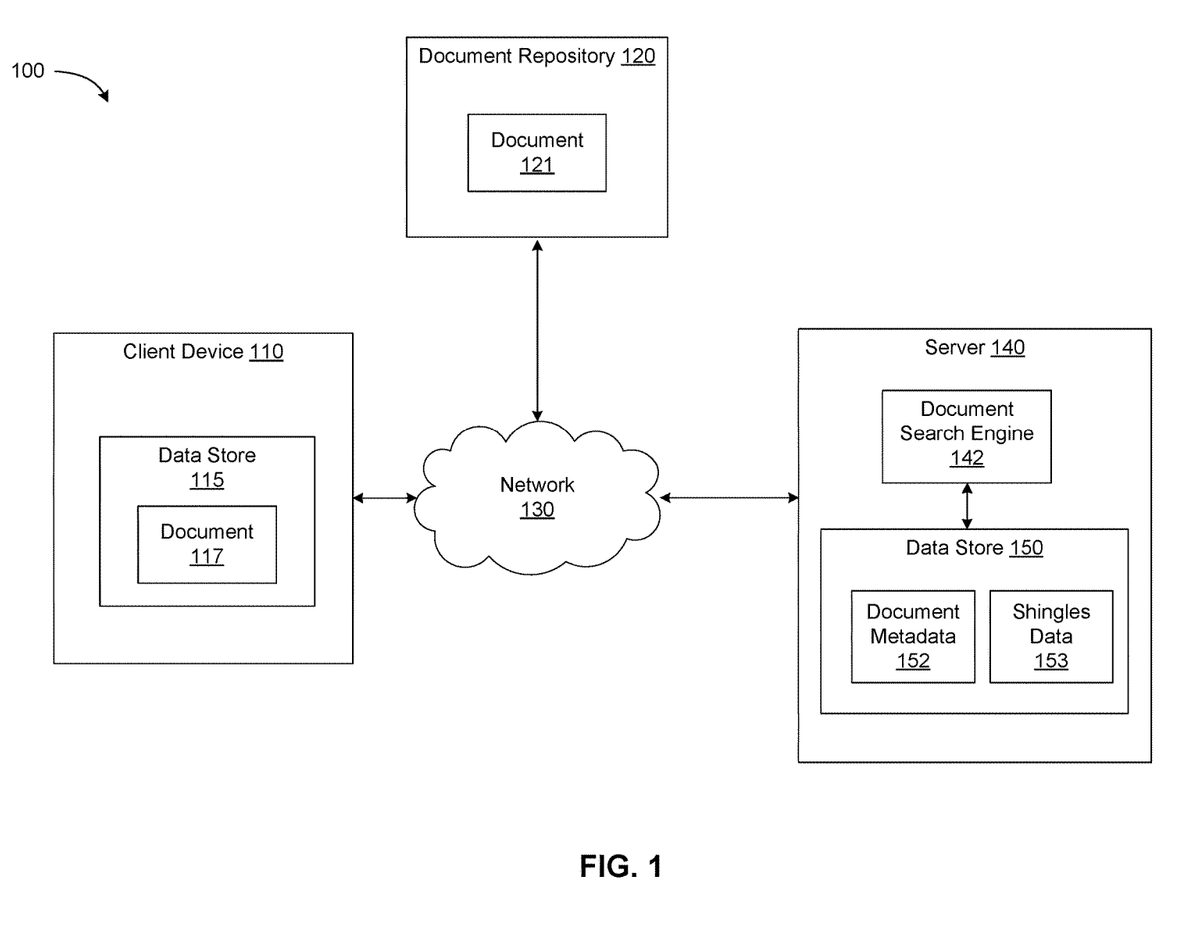
FIG. 1 is a block diagram illustrating a networked environment in which embodiments of the present disclosure may be implemented.

FIG. 1 is a block diagram illustrating a networked environment 100 in which embodiments of the present disclosure may be implemented. The networked environment 100 can include one or more client devices 110, one or more servers 140, and one or more document repositories 120, which can be in data communication with each other via network 130. Computer system 600 illustrated in FIG. 6 may be one example of any of client devices 110 or servers 140. The network 130 may include, for example, the Internet, intranets, extranets, wide area networks (WANs), local area networks (LANs), wired networks, wireless networks, or other suitable networks, etc., or any combination of two or more such networks. For example, such networks may comprise satellite networks, cable networks, Ethernet networks, and other types of networks.

Client devices 110 may include processor-based systems such as computer systems. Such computer systems may be embodied in the form of desktop computers, laptop computers, personal digital assistants, cellular telephones, smartphones, set-top boxes, music players, web pads, tablet computer systems, game consoles, electronic book readers, or other devices with similar capability. In one embodiment, client device 110 includes a data store 115 that stores one or more documents 117 for a user of the client device.

Client device 110 may communicate with one or more document repositories 120 that may store documents (e.g., documents 121) for the user of the client device. In some implementations, document repository 120 may be a local document storage system within local area network. For example, document repository may be a file system accessible via a network attached storage (NAS) system, a shared network directory 120, or the like. In some implementations, document repository 120 may be a cloud based document storage system that is accessible to client device 110 via the Internet. For example, document repository 120 may be Dropbox®, Google Drive®, Apple's iCloud Drive®, Amazon Drive®, or any other similar cloud-based storage system. Although, for simplicity, only one document repository 120 is depicted, in some embodiments, client device 110 may communicate with multiple document repositories 120.

Documents 117, 121 may be any type of document that includes text that may be indexed for a search engine. For example, documents 117, 121 may include a word processing document, a presentation document, a spreadsheet, an image that has been processed by optical character recognition (OCR) to embed text with the image, a markup document (e.g., hypertext markup language (HTML), extensible markup language (XML), etc.), or the like. In some implementations, documents 117, 121 may also include text messages, online chat transcripts, email messages, or any other similar type of document. In various embodiments, the text within documents 117, 121 may include multiple characters that may in turn form multiple words.

Server 140 may include, for example, a server computer or any other system providing computing capability. Alternatively, server 140 may employ a plurality of computing devices that may be arranged, for example, in one or more server banks or computer banks or other arrangements. Such computing devices may be positioned in a single location or may be distributed among many different geographical locations. For example, server 140 may include a plurality of computing devices that together may comprise a hosted computing resource, a grid computing resource and/or any other distributed computing arrangement. In some cases, server 140 may correspond to an elastic computing resource where the allotted capacity of processing, network, storage, or other computing-related resources may vary over time.

In some implementations, server 140 can include a document search engine 142 and a data store 150. Document search engine 142 can manage parsing, analyzing, indexing, and searching of documents 117 stored on client device 110 and/or documents 121 stored in document repositories 120 in order to facilitate grouping of documents 117, 121 by content similarity in search results. In some implementations, document search engine 142 may be invoked via a request received from a user of client device 110. The user may interact with the document search engine 142 via a graphical user interface on client device 110 to initiate analyzing and indexing of the user's documents stored either locally on client device 110 or in document repository 120, and subsequently to initiate searches of those documents including grouping documents by content similarity in search results provided by the document search engine 142.

In some implementations, server 140 can include a data store 150 that may store document metadata 152 and shingles data 153. Data store 150 may include one or more mass storage devices which can include, for example, flash memory, magnetic or optical disks, or tape drives; read-only memory (ROM); random-access memory (RAM); erasable programmable memory (e.g., EPROM and EEPROM); flash memory; or any other type of storage medium.

Document metadata 152 may be a data structure that stores entries that are each associated with one of the user's documents 117 stored on client device 110 or documents 121 stored in document repository 120. Document metadata 152 may be maintained by document search engine 142 to facilitate grouping documents by content similarity as described further herein. Document metadata 152 may include multiple entries, each associated with one of the stored documents analyzed and indexed by document search engine 142, where each entry includes identified shingles of one of the documents. A shingle may also be referred to as an "n-gram" and is a contiguous sequence of "n" items from a given sequence of text or speech. The items can be phonemes, syllables, letters, words, or base pairs, to name a few examples.

In natural language processing, a w-shingling is a set of unique "shingles" (n-grams, contiguous subsequences of tokens in a document) that can be used to gauge the similarity of two documents. A token may refer to a structure representing a lexeme (a basic lexical unit of a language, consisting of one word or several words, considered as an abstract unit, and applied to a family of words related by form or meaning). The w in "w-shingling" denotes the number of tokens in each shingle in the set. For example, the document, "a rose is a rose is a rose" can be tokenized as follows:

(a,rose,is,a,rose,is,a,rose). The set of all contiguous sequences of 4 tokens (4-grams) is {(a,rose,is,a), (rose,is,a,rose), (is,a,rose,is), (a,rose,is,a), (rose,is,a,rose)}={(a,rose,is,a), (rose,is,a,rose), (is,a,rose,is)}.

In some implementations, a single entry in document metadata 152 may contain all of the shingles identified in a single document. Each entry may additionally include a unique document identifier associated with the location of the document, a unique identifier associated with the user associated with the document, other metadata such as document title, author, date/time the document was created, or other similar identifying information. Document metadata 152 may be stored as a database, a linked list, a log based data structure, or in any similar manner.

In an illustrative example, document search engine 142 can initiate the analysis and indexing of documents 117, 121. In some implementations, document search engine 142 may receive a notification from a user interface of client device 110 to initiate the indexing of documents 117, 121. Alternatively, a component of document search engine 142 may execute independently of client device 110 as a background task of server 140 to monitor the contents of data store 117 and/or document repository 120 and initiate indexing of a new document added to either repository, an existing document that is modified, or the like.

Document search engine 142 may obtain a document from data store 117 and/or document repository 120 and load the document into a memory space of server 142 for processing. Alternatively, document search engine 142 may load the document into temporary storage on server 142. Once the document has been obtained, document search engine 142 may then parse the document to extract the textual content from the document, generate a unique document identifier associated with the location of the document, determine a unique user identifier associate with the user, identify shingles in the document, and store the information in document metadata 152.

In some implementations, the unique document identifier may indicate the storage repository 120 that stores the document. Additionally or alternatively, the unique identifier may indicate the location within the document repository 120 (or the location in the data store 115 on client device 110) where the document is stored (e.g., the directory structure within the file system). For example, the unique identifier may include a uniform resource locator address (URL) of the document within document repository 120. In one embodiment, the unique identifier may be a hash value of the location information, which may then be encoded to generate an encrypted hash value.

As part of identifying shingles in a document, document search engine 142 may store a record for each identified shingle in shingles data 153. Each record in shingles data 153 may include the sequence of tokens that comprise the shingle and the document identifiers of documents that include the shingle. When a shingle is identified that already includes a record in shingle data 153, the document identifier of the document having the shingle is added to the record corresponding to the shingle in shingles data 153. If the shingle does not have a corresponding record in the shingle data 153, then a new record is created and the document identifier is added to the record.

Document search engine 142 may later use the document metadata 152 and shingles data 153 information to group documents by content similarity in response to search queries of the contents of the documents. For example, document search engine 142 may further receive a search query from the client device. The search query may include input text entered by the user into a user interface that is presented on client device 110. The user interface may present an input field for the user to enter the search string to search the content (e.g., the text) within documents stored either locally or in document repository 120. The user interface may be an application executing on the client device 110, a browser window, or the like.

Document search engine 142 may identify a list of documents that satisfy the search query. In implementations of the disclosure, document search engine 142 may further access document metadata 152 to identify the shingles in the documents that include the string in the search query (e.g., any document whose textual content includes the search query string). Shingles data 153 is then used to identify other documents having the same shingles, and this information is used to group documents having similar content (as indicated by co-occurrence of shingles in the documents) in the search results that are returned to client device 110. In some implementations, the search results may include metadata associated with the document (e.g., document title) as well as the location of the document (e.g., the URL for the document within the document repository, the location of the document on the client device, etc.). Document search engine 142 is described in further detail below with respect to FIG. 2.

Figure 2:
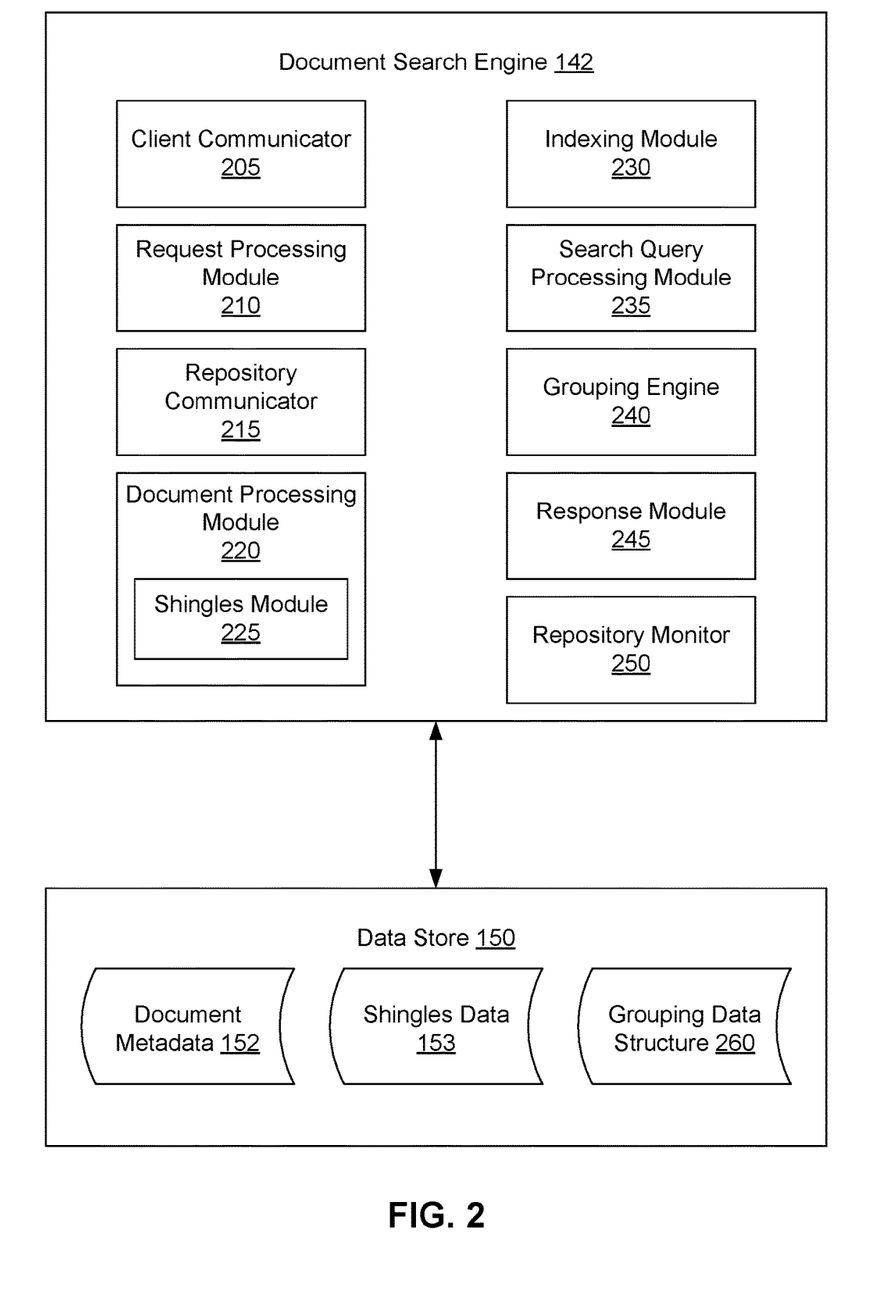
FIG. 2 is a block diagram illustrating a document search engine, according to an embodiment.

FIG. 2 is a block diagram of one embodiment of a document search engine 142 showing logical modules that may be loaded into and executed by a processing device of server device. In one embodiment, document search engine 142 corresponds to document search engine 142 of server 140 of FIG. 1. In some implementations, document search engine 142 can include user client communicator 205, request processing module 210, repository communicator 215, document processing module 220, shingles module 225, indexing module 230, search query analyzer 235, grouping engine 240, response module 245, and repository monitor 250. This arrangement of modules and components may be a logical separation, and in other embodiments, these modules or other components can be combined together or separated in further components. In some implementations, the components of document search engine 142 may be included on a single server (e.g., server 140 of FIG. 1). Alternatively, the components of document search engine 142 may be divided across multiple servers.

In some implementations, data store 150 may be connected to document search engine 142, and can include document metadata 152, shingles data 153, and grouping data structure 260. In one embodiment, a single server (e.g., server 140 of FIG. 1) may include document search engine 142 and data store 150. In another embodiment, data store 150 may be on a different server from that of document search engine 142, and may be connected over a network or other connection.

In an illustrative example, document search engine 142 may maintain document metadata 152 and shingles data 153. Document metadata 152 may be a data structure that stores entries that are each associated with one of the user's documents 117 stored on client device 110 or documents 121 stored in document repository 120. Document metadata 152 may include multiple entries, each associated with one of the stored documents analyzed and indexed by document search engine 142, where each entry includes identified shingles of one of the documents.

As noted above, each entry in document metadata 152 may contain the all of the shingles identified in a single document. Each entry may additionally include a unique document identifier associated the location of the document, a unique identifier associated with the user associated with the document, other metadata such as document title, author, date/time the document was created, or other similar identifying information. Document metadata 152 may be stored as a database, a linked list, a log based data structure, or in any similar manner.

To maintain document metadata 152 and shingles data 153, document search engine 142 obtains a user's documents from a client device data store or a document repository, parses the documents, extracts the textual content from those documents, and builds shingles over the extracted text. In one example, the shingles built over the extracted text may be 10-shingles. Client communicator 205 may receive a request from a client device to initiate the process. Client communicator 205 may be invoked by a communication request sent by the user interface of a client device (e.g., client device 110 of FIG. 1). The user interface may be a window, a dialog box, a prompt for textual input, or the like. A user may enter a request to index one or more documents (e.g., documents 117, 121 of FIG. 1), which can cause the client communicator 205 to invoke request processing module 210 to process the request and begin analyzing, indexing, and building shingles for the document.

Document processing may also be performed independently of a specific user request. For example, repository monitor 250 may monitor the contents of a document repository and initiate indexing of a new document added to the repository, an existing document that is modified (i.e., re-indexing), or the like. Alternatively, repository monitor 250 may receive a notification from the document repository that a document has been modified, and subsequently send a request to the document repository to obtain the document for processing.

Request processing module 210 may receive information from the user to enable document search engine 142 to analyze, index, and build shingles over the documents of a document repository. For example, request processing module 210 may receive the login credentials of the user for the document repository to grant document search engine 142 the authority to access the documents stored there. Request processing module 210 may then invoke repository communicator 215 to obtain access to the specified repository using the received credentials, and download a document to be processed. In one embodiment, the user may additionally specify the document to be indexed in the request. In another embodiment, repository communicator 215 may begin downloading documents based on user-defined configuration. For example, repository communicator 215 may obtain the most recently added document, the most recently updated document, or the like. Once obtained, repository communicator 215 may load the document into a memory space (or temporary storage space) of server 140 and invoke document processing module 220 to process the document.

Document processing module 220 may parse the obtained document to extract textual content, where the textual content is made up of multiple characters. Extracting textual content may include removing formatting, pictures, punctuation, and so on from the document. In some implementations, once the textual content has been extracted, document processing module 220 may perform one or more data processing operations on the textual content to normalize the text. For example, document processing module 220 may remove punctuation characters from the textual content, convert uppercase characters to lowercase characters, remove symbolic characters from the textual content, remove non-meaning words (e.g., unions, articles, etc.), convert nouns to singular form, convert verbs to infinitive form, or the like.

Document processing module 220 may additionally generate a unique identifier associated with the location of the document in the document repository. In some implementations, the unique identifier may indicate the storage repository that stores the document. For example, the unique identifier may include a uniform resource locator address (URL) of the document repository, the Internet Protocol (IP) address of the document repository, or other similar identifying information. Additionally, the unique identifier may indicate the location within the storage repository or on a client device where the document is stored (e.g., the directory structure within the filesystem of the client device or document repository). In one embodiment, in order to store the location information as a fixed length, document processing module may generate the unique identifier as a hash value of the location information.

Document processing module 220 may determine a unique user identifier associated with the user. For example, the unique user identifier may include a user authentication credential utilized by the user when accessing the document search engine 142 (e.g., a user sign-on). Alternatively, the unique user identifier may be an identifier associated with the client device that generated the request to index the user's documents. Document processing module 220 may subsequently store the textual content, unique document identifier, and unique user identifier in document text 152.

The shingles module 225 of document processing module 220 may build shingles for the document, and store the built shingles for the document in document metadata 152 and in shingles data 153. In one implementation, the shingles may be w-shinglings where the "w" is configured by an administrator of the document search engine 142. As noted above, shingles module 225 may store a record for each built shingle in shingles data 153. Each record in shingles data 153 may include the sequence of tokens that comprise the shingle and the document identifiers of documents that include the shingle. When a shingle is identified that is already associated with a record in shingle data 153, the shingles module 225 adds a document identifier of the document having the shingle to the corresponding record for the shingle in shingles data 153. If the shingle does not have a corresponding record in the shingle data 153, then the shingles module 225 creates a new record for the shingle in shingles store 153 and adds the document identifier to the new record. In this way, the shingles found in any document can be identified from document metadata 152 and the documents associated with any one shingle can be determined from shingles data 153.

In some implementations, document processing module 220 may also extract other document metadata from each document processed. The other document metadata may include the document title, author, date/time the document was created, or the like. Document processing module 220 may then invoke indexing module 230 to index the textual content, the document metadata including the built shingles and the other document metadata, unique document identifier, and document location to generate document metadata 152 and shingles data 153.

Subsequently, request processing module 210 may receive a search query from the client device. Search query processing module 235 may then be invoked to parse the query and identify any documents associated with input text (i.e., a search string) of the search query. In one implementation, a user interface may present an input field for a user to enter the search string to search the content (e.g., the text) within documents stored either locally on a client device or in document repository. The user interface may be an application executing on the client device, a browser window, or the like. Search query processing module 235 may additionally identify metadata associated with the identified documents (e.g., document identifier, document title) as well as the location of the document (e.g., the URL for the document within the document repository, the location of the document on the client device, etc.).

Grouping engine 240 may then access document metadata 152 and shingles data 153 to identify other documents having the same shingles as the documents returned by the search query processing module 235. This information is used by grouping engine 240 to group documents having similar content (as indicated by co-occurrence of shingles in the documents) in the search results. For example, for each document identifier returned as a match by the search query processing module 235, the grouping engine 240 identifies the shingles associated with the document identifier from document metadata 152. For each identified shingle of the document identifier, the grouping engine 240 obtains the document identifiers corresponding to the identified shingle from shingles data 153.

The grouping engine 240 then obtains document identifiers (may be referred to herein as a second set of document identifiers) corresponding to the identified shingle and inputs these obtained document identifiers into a grouping data structure 260 of data store 150. The grouping data structure 260 can be a key-value data structure allowing fast search of elements of the key-value data structure. For example, the grouping data structure 260 may include, but is not limited to, a hashmap container, a map container, a tree data structure, other structures with fast lookup (e.g., hash, tree, etc.), and so on. The grouping data structure 260 includes a record for each shingle and a corresponding counter to track a number of occurrence of the associated shingle (i.e., no shingle has more than one record in the grouping data structure 260). When a shingle is input to the grouping data structure 260, a determination is made whether a record for the shingle already exists in the grouping data structure 260. If a record exists, then the corresponding counter for that record is incremented by 1. On the other hand, if a record does not exist, then a new record is created for the shingle and the corresponding counter is set to 1.

After all shingles for a document identifier from the search results have been processed by the grouping engine, the first N document identifiers with the highest counts are extracted from the grouping data structure 260. The threshold number ("N") of documents may be configured by an administrator of the document searching engine 142. In some implementations, a threshold percentage of documents may be configured for extraction from the grouping data structure 260. In one implementation, the document identifier of the document from which the shingles were obtained is disregarded in the grouping data structure 260. Grouping engine 240 may repeat the above grouping process for each document identifier returned in the search results.

If the extracted document identifiers (from grouping data structure 260) exist in the search results, then these documents are grouped within the search results that are provided to an originator of the search query. For example, the placement of the documents may be configured so that the documents identified with similar content appear close to one another in the search results. In another example, the documents identified with similar content may be grouped so that similar documents appear as sub-results to a document via an expansion list (e.g., that can be expanded by selecting an icon or link associated with the document). If such document identifiers do not exist in the search results, then these documents may be displayed in the search results as "suggested" documents similar to the associated documents in the search results. In one example, the suggested documents may be marked as similar (e.g., with text identifying the similar other one or more documents and/or via placement in the search results with respect to the one or more other similar documents) with a similarity score based on a corresponding count for the document identifier from the counter in the grouping data structure 260.

Response module 245 may be invoked to send a response to the client device. The response may include the search results, which provides the documents grouped by content similarity as described above. In various implementations, response module 245 may send the document identifier, the metadata, and/or the document location to the client device in response to the search query. An illustrative example of grouping documents by content similarity is depicted below with respect to FIG. 3.

Figure 3:
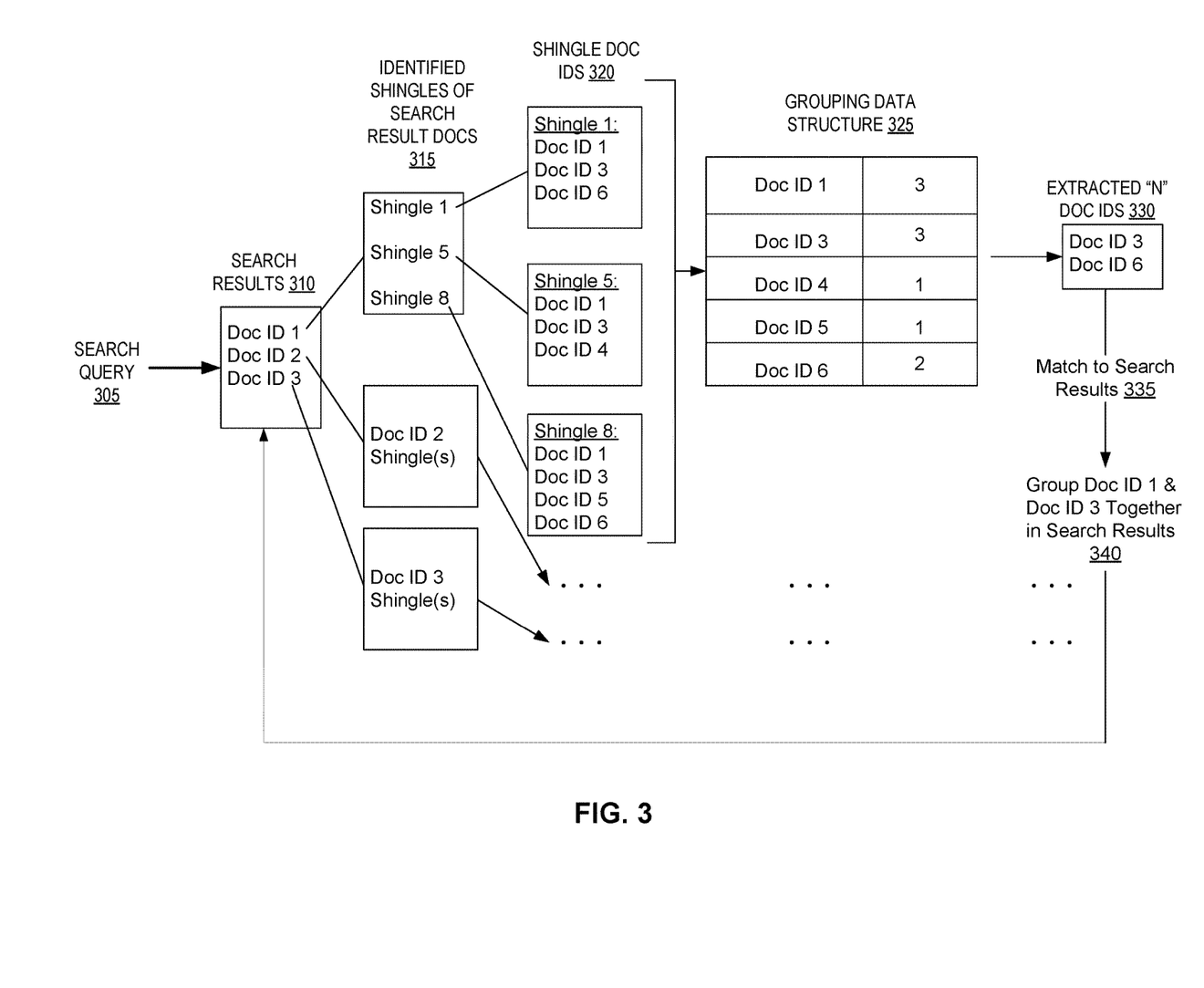
FIG. 3 is a block diagram illustrating an example of grouping documents by content similarity, according to an embodiment.

FIG. 3 is a block diagram illustrating an example of grouping documents by content similarity, according to an embodiment. As shown in FIG. 3, a search query is received. The search query may be received via an input field (e.g., at a client device 110 of FIG. 1), which facilitates input of a search string to search the content (e.g., text) within documents stored either locally on the client device or in a document repository. The input filed may be provided via a user interface, which may be an application executing on the client device, a browser window, or the like. A request processing module (e.g., request processing module 210 of document search engine 142 of FIG. 2) may receive and/or identify documents satisfying the search query as a set of search results 310. The request processing module may determine document identifiers associated with the documents of the search results. The document identifiers associated with the documents of the search results may be referred to herein as a first set of document identifiers.

For example, for each document identifier in search results 310, a grouping engine (e.g., grouping engine 240 of document search engine 142 of FIG. 2) identifies shingles 315 associated with the document identifier. The shingles may be obtained from document metadata (e.g. document metadata 152 of FIG. 2) maintained for the documents. For example, the document identified as Doc ID 1 may have three shingles, Shingle 1, Shingle 5, and Shingle 8. Shingles may similarly be identified for Doc ID 2 and Doc ID 3, although that is not specifically illustrated in FIG. 3.

Once shingles 315 associated with each document identifier have been identified, the grouping engine may then, for each identified shingle of the document identifier, obtain document identifiers 320 (may be referred to herein as a second set of document identifiers) corresponding to the identified shingle. In one implementation, this second set of document identifiers may be obtained from a shingles data store (e.g., shingles data 153 of FIG. 2). As illustrated in FIG. 3, the document identifiers associated with Shingle 1 include Doc ID 1, Doc ID 3, and Doc ID 6. The document identifiers associated with Shingle 5 include Doc ID 1, Doc ID 3, and Doc ID 4. The document identifiers associated with Shingle 8 include Doc ID 1, Doc ID 3, Doc ID 5, and Doc ID 6. Document identifiers may similarly be obtained for the each of the shingles associated with Doc ID 2 and Doc ID 3, although that is not specifically illustrated in FIG. 3.

The grouping engine may then input the obtained document identifiers for the shingles of one of the document identifiers in the first set of document identifiers (i.e., document identifier for a document returned as part of the search results 310) into a grouping data structure 325 (e.g., grouping data structure 260 of FIG. 2). The grouping data structure 325 includes a record for each shingle and a corresponding counter to track a number of occurrences of the associated shingle so that no shingle has more than one record in the grouping data structure 325. For example, as shown in FIG. 3, within the shingle Doc IDs 320 associated with Doc ID 1, Doc ID 1 occurs three times, Doc ID 3 occurs three times, Doc ID 4 occurs one time, Doc ID 5 occurs one time, and Doc ID 6 occurs two times. These document identifiers and their associated counts are reflected in grouping data structure 325.

After all shingles for a document identifier from the search results (e.g., first set of document identifiers) have been reflected in the grouping data structure 325, the grouping engine extracts the first N document identifiers 330 with the highest counts from the grouping data structure 325. The threshold number ("N") of documents may be configured by an administrator. In one implementation, the document identifier of the document from which the shingles were obtained is disregarded in the grouping data structure 325. With respect to FIG. 3, assume that the threshold number "N" is configured in the grouping engine as the value 2. As such, if the originating document identifier (i.e., Doc ID 1) is disregarded, then the two document identifiers corresponding to the highest count are Doc ID 3 (with a count of 3) and Doc ID 6 (with a count of 2). As such, Doc ID 3 and Doc ID 6 are extracted 330. Grouping engine may repeat the above grouping process for each document identifier of the first set of document identifiers in the search results 310.

If the extracted document identifiers 330 exist in the search results 335 (e.g., Doc ID 3 is found in search results 310 while Doc ID 6 is not), then the documents associated with these document identifiers are grouped 340 within the search results 310 that are provided to an originator of the search query. For example, Doc ID 1 and Doc ID 3 would be grouped together as having similar content in search results 310. In one implementation, if a document identifier(s) do not exist in the search results (e.g., Doc ID 6 in the example provided in FIG. 3), then these documents may be displayed in the search results as "suggested" documents similar to the associated documents in the search results. In one example, the suggested documents may be marked as similar with a similarity score based on a corresponding count for the document identifier from the counter in the grouping data structure 325. The extraction 330, matching to search results 335, and grouping together in search results 340 may be repeated for each document identifier in search results 310 (e.g., repeat above process for Doc ID 2 and Doc ID 3).

Figure 4:
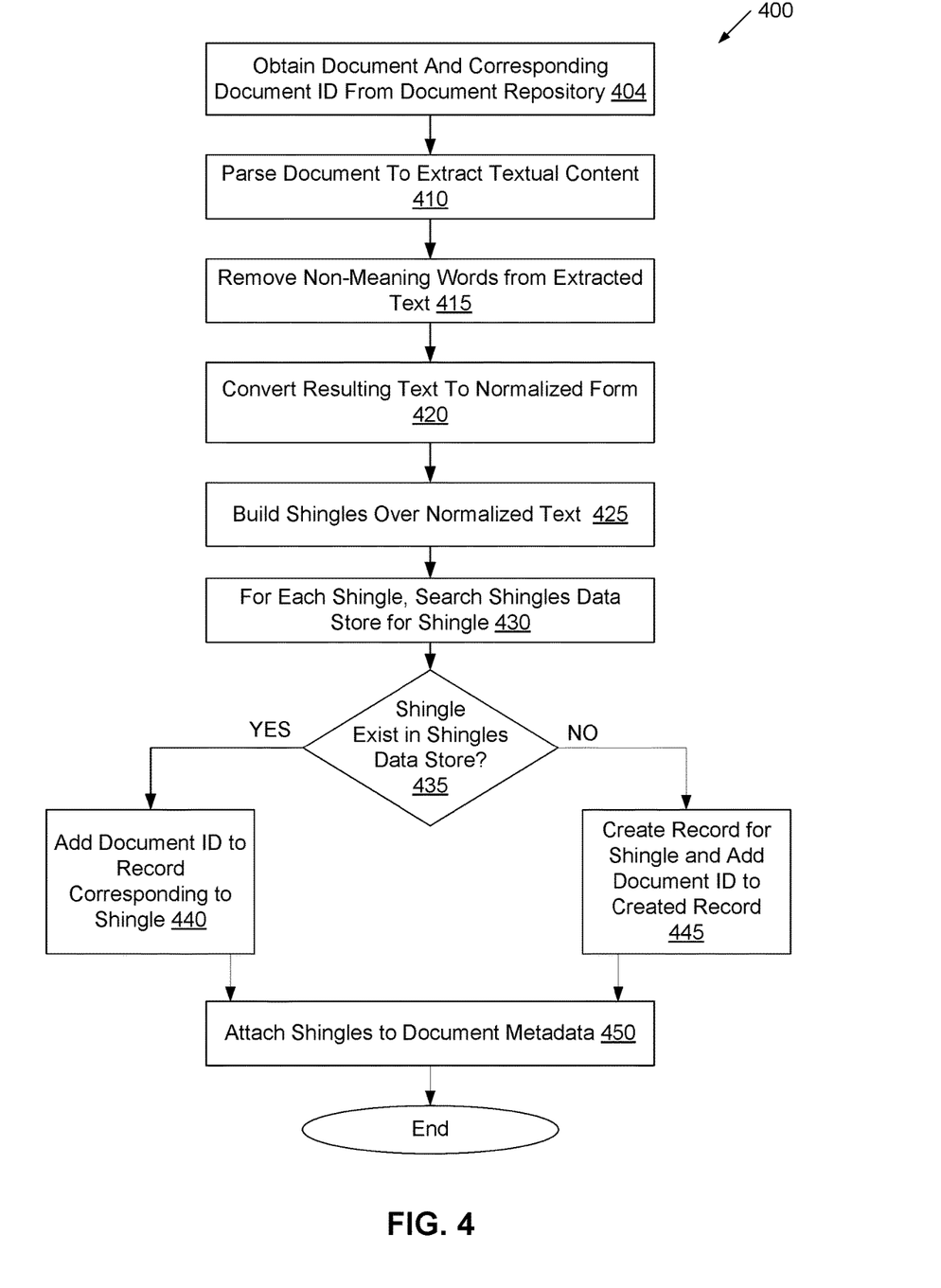
FIG. 4 is a flow diagram illustrating a method of identifying shingles as part of a document indexing process, according to an embodiment.
Figure 5:
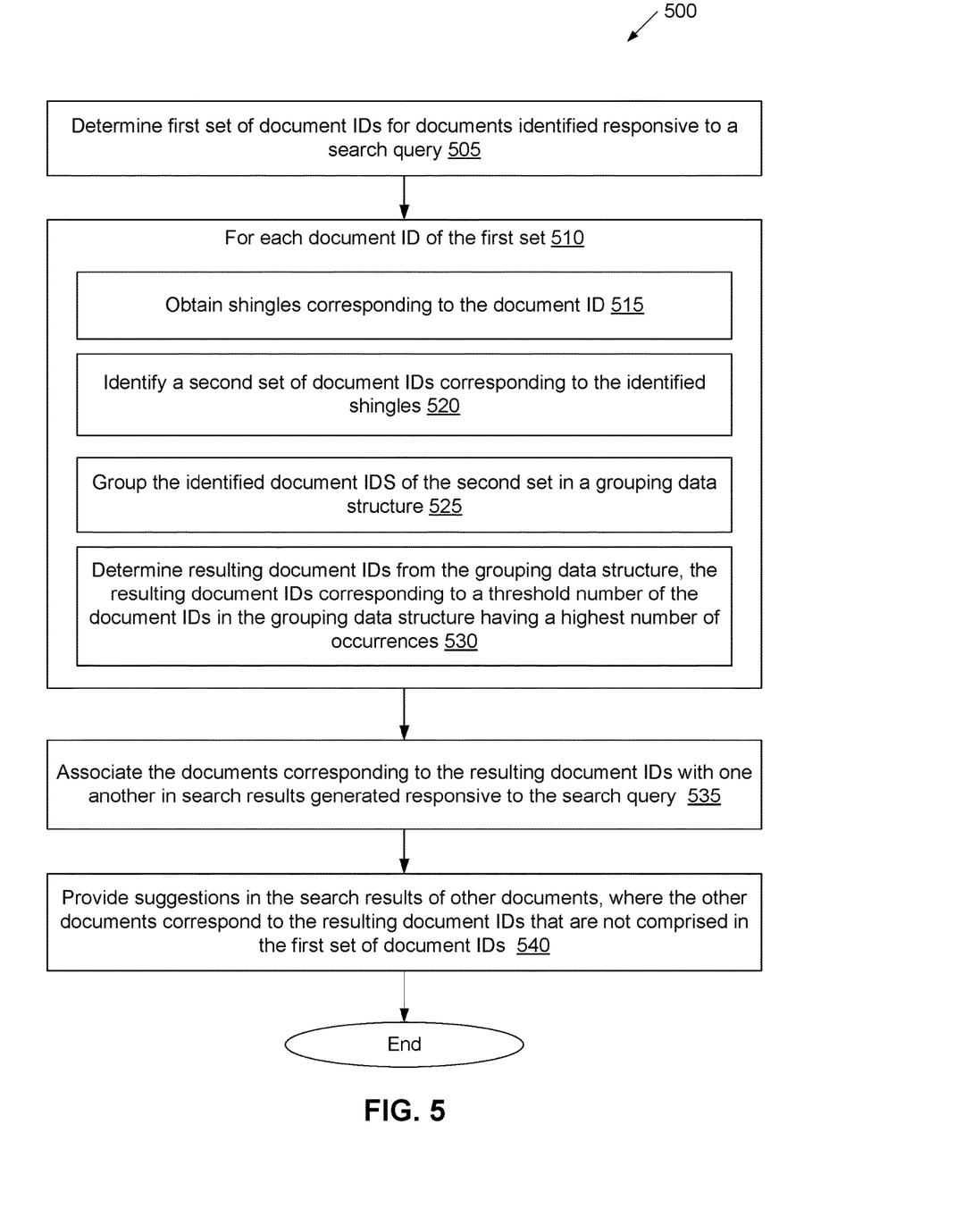
FIG. 5 is a flow diagram illustrating a method of grouping documents by content similarity, according to an embodiment.

FIGS. 4-5 are flow diagrams of various implementations of methods related to grouping documents by content similarity. The methods are performed by processing logic that may include hardware (circuitry, dedicated logic, etc.), software (such as is run on a general purpose computer system or a dedicated machine), or a combination of both. Some methods may be performed by a document search engine on a server such as document search engine 142 of FIGS. 1-2.

For simplicity of explanation, the methods are depicted and described as a series of acts. However, acts in accordance with this disclosure can occur in various orders and/or concurrently, and with other acts not presented and described herein. Furthermore, not all illustrated acts may be utilized to implement the methods in accordance with the disclosed subject matter. In addition, those skilled in the art will understand and appreciate that the methods could alternatively be represented as a series of interrelated states via a state diagram or events.

FIG. 4 is a flow diagram illustrating an embodiment for a method 400 of identifying shingles as part of a document indexing process. At block 405 of method 400, processing logic obtains a document and corresponding document identifier (ID) from a document repository. At block 410, processing logic parses the document to extract textual content. At block 415, processing logic removes non-meaning words from the extracted text.

At block 420, processing logic converts the resulting text to normalized form. At block 425, processing builds shingles over the normalized text. At block 430, processing logic, for each shingle, searches a shingles data store for the shingle. At decision block 435, processing logic determines, for each shingle, whether a record for the shingle exists in the shingles data store. If so, method 400 proceeds to block 440 where processing logic adds the document ID to the record corresponding to the shingle in the shingles data store. On the other hand, if a record does not exist for the shingle at decision block 435, then method 400 proceeds to block 445 where processing logic creates a new record for the shingle and adds the document ID to the created record.

At block 450, processing logic attaches all of the shingles for the document to document metadata. After block 450, the method of FIG. 4 terminates.

FIG. 5 is a flow diagram illustrating an embodiment for a method 500 of grouping documents by content similarity. At block 505 of method 500, processing logic determines a first set of document identifiers (IDs) for documents identified responsive to a search query. At block 510, processing logic performs blocks 515 through 530 for each document ID in the first set of document IDs. At block 515, processing logic obtains shingles corresponding to the document ID. At block 520, processing logic identifies a second set of document IDs corresponding to the identified shingles.

At block 525, processing logic groups the identified document IDs of the second set into a grouping data structure. At block 530, processing logic determines resulting document IDs from the grouping data structure, where the resulting document IDs correspond to a threshold number of the document IDS in the grouping data structure having a highest number of occurrences.

At block 535, processing logic associates the documents corresponding to the resulting document IDs with one another in search results generated responsive to the search query. At block 540, processing logic provides suggestions in the search results of other documents, where the other documents correspond to the resulting document IDs that are not comprised in the first set of document IDs. In one implementation, each of the suggested other documents is associated (in the search results) with the document corresponding to the document ID that was used to identify the other document's document ID at block 520. After block 540, the method of FIG. 5 terminates.

Figure 6:
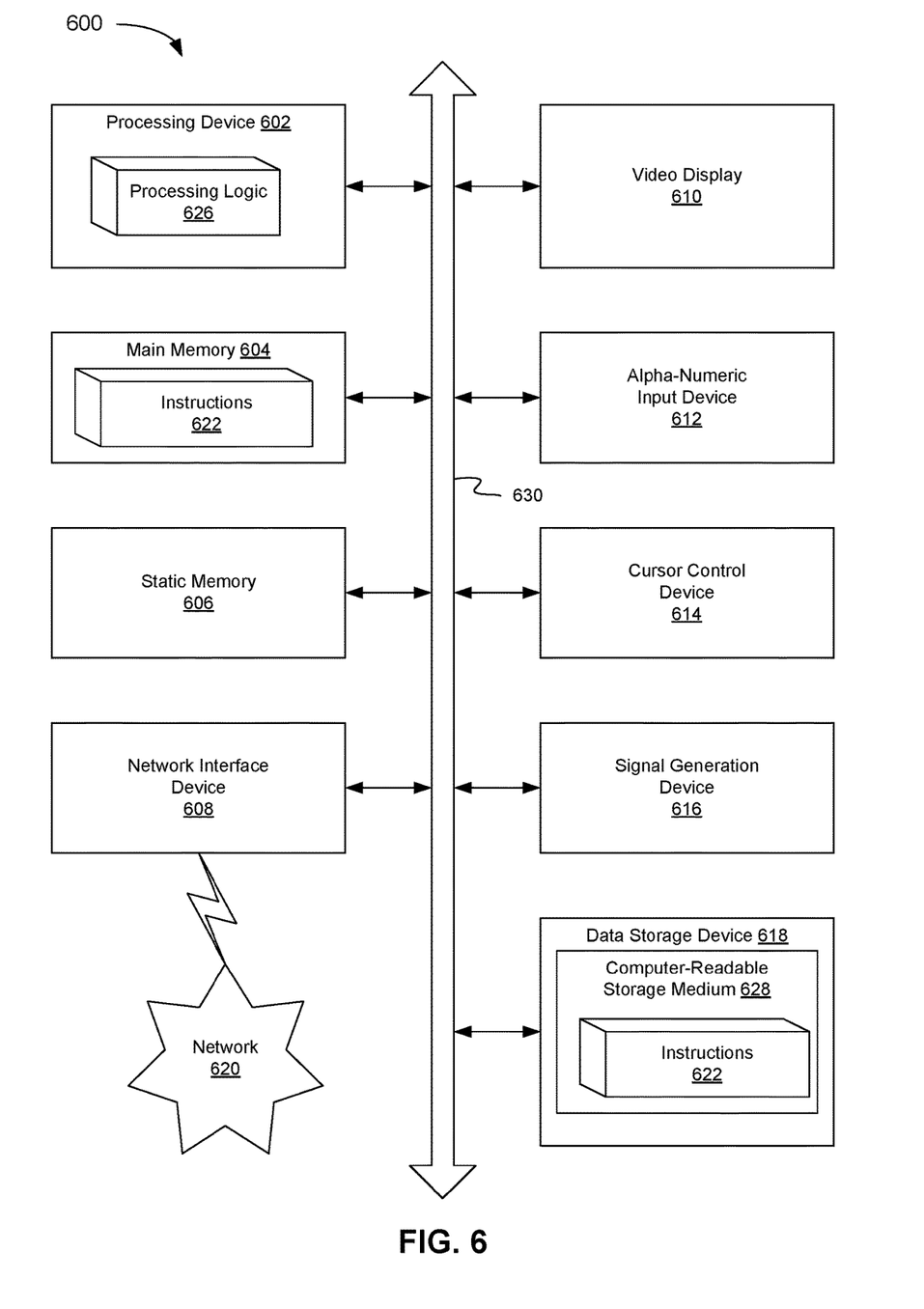
FIG. 6 is a block diagram illustrating an exemplary computer system, according to an embodiment.

FIG. 6 illustrates a diagrammatic representation of a machine in the exemplary form of a computer system 600 within which a set of instructions, for causing the machine to perform any one or more of the methodologies discussed herein, may be executed. For example, the instructions may cause the machine to perform grouping documents by content similarity. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 600 may represent server 140 of FIGS. 1-2.

The exemplary computer system 600 includes a processing device (processor) 602, a main memory 604 (e.g., read-only memory (ROM), flash memory, dynamic random access memory (DRAM) such as synchronous DRAM (SDRAM)), a static memory 606 (e.g., flash memory, static random access memory (SRAM)), and a data storage device 618, which communicate with each other via a bus 630.

Processing device 602 represents one or more general-purpose processing devices such as a microprocessor, central processing unit, or the like. More particularly, the processing device 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 602 may also be one or more special-purpose processing devices such as an application specific integrated circuit (ASIC), a field programmable gate array (FPGA), a digital signal processor (DSP), network processor, or the like. The processing device 602 is configured to execute the processing logic 626 for performing the operations and steps discussed herein. In one embodiment, processing logic 626 is representative of document search engine 142 of FIGS. 1-2.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 618 may include a computer-readable medium 628 on which is stored one or more sets of instructions 622 (e.g., instructions of document search engine 142) embodying any one or more of the methodologies or functions described herein. The instructions 622 may also reside, completely or at least partially, within the main memory 604 and/or within processing logic 626 of the processing device 602 during execution thereof by the computer system 600, the main memory 604 and the processing device 602 also constituting computer-readable media. The instructions may further be transmitted or received over a network 620 via the network interface device 608.

While the computer-readable storage medium 628 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

The preceding description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those utilizing physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "obtaining", "maintaining", "analyzing", "receiving," "identifying," "determining," "providing," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the described purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the method steps. The structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method to facilitate grouping a corpus of documents by content similarity, the method comprising:
   determining, by a processing device, a first set of document identifiers (IDs) for a first set of documents of the corpus of documents, the first set of documents identified responsive to a search query;
   obtaining at least one shingle corresponding to the first set of document IDs;
   identifying a second set of document IDs corresponding to the obtained at least one shingle;
   grouping, by the processing device, the second set of document IDs in a grouping data structure based on document IDs;
   determining, by the processing device, resulting document IDs from the grouping data structure, wherein each resulting document ID from the resulting document IDs is determined based on a threshold number of occurrences; and
   associating, by the processing device, resulting documents of the first set of documents that correspond to the resulting document IDs with one another in search results generated responsive to the search query to create a final search result to send to a user.

2. The method of claim 1, wherein the search query comprises receiving a keyword search term.

3. The method of claim 1, wherein the at least one shingle comprises a contiguous subsequences of tokens in a document of the first documents that corresponds to the document ID.

4. The method of claim 1, wherein the grouping structure is a key-value data structure allowing fast search of elements of the key-value data structure.

5. The method of claim 1, wherein the grouping structure is at least one of a hashmap container data structure or a tree data structure.

6. The method of claim 1, wherein each document ID of the second set corresponds to a single record in the grouping structure, and wherein each record comprises a counter to track a number of the occurrences of the document ID in the second set.

7. The method of claim 1, wherein associating the resulting documents further comprising ordering the resulting documents within the search results so that the resulting documents corresponding to the resulting documents IDs are next to one another.

8. The method of claim 1, wherein determining the resulting document IDs further comprises disregarding the document ID of the first set for which the at least one shingle was obtained.

9. The method of claim 1, wherein responsive to one of the resulting document IDs not comprised in the first set of document IDs, providing a document corresponding to the one of the resulting document IDs as a suggested related document in the search results.

10. The method of claim 1, wherein the at least one shingle is obtained from a shingles data store generated as part of indexing of the corpus of documents.

11. The method of claim 10, wherein generating shingles records for shingles in the shingles data store comprises:
   obtaining an obtained document of the corpus of documents and a corresponding document ID of the document from a document repository;
   parsing the obtained document to extract textual content;
   removing non-meaning words from the extracted textual content to generate resulting text;
   converting the resulting text to a normalized format;
   generating the shingles over the normalized format;
   for each of the generated shingles:
      searching the shingles data store for the generated shingle;
      responsive to a record existing for the generated shingle in the shingles data store, adding the corresponding document ID to the record; and
      responsive to the generated shingle not existing in the shingles data store, generating a new record for the generated shingle in the shingles data store and adding the corresponding document ID to the record; and
   attaching the generated shingles to metadata of the document in the document repository.

12. The method of claim 11, wherein generating the shingles records occurs during at least one of indexing or re-indexing of the document in the document repository.

13. The method of claim 11, wherein the second set of documents IDs is obtained from the shingles data store.

14. A server computing system comprising:
   a memory; and
   a processing device operatively coupled to the memory, the processing device to:
      determine a first set of document identifiers (IDs) for a first set of documents of the corpus of documents, the first set of documents identified responsive to a search query;
      obtain at least one shingle corresponding to the first set of document IDs;
      identify a second set of document IDs corresponding to the obtained at least one shingle;
      group the second set of document IDs in a grouping data structure based on document IDs;
      determine resulting document IDs from the grouping data structure, wherein each resulting document ID from the resulting document IDs is determined based on a threshold number of occurrences;
      associate resulting documents of the first set of documents that correspond to the resulting document IDs with one another in search results generated responsive to the search query to create a final search result to send to a user; and
      responsive to one of the resulting document IDs not comprised in the first set of document IDs, provide a document corresponding to the one of the resulting document IDs as a suggested related document in the search results.

15. The server computing system of claim 14, wherein the at least one shingle comprise contiguous subsequences of tokens in the documents.

16. The server computing system of claim 14, wherein the grouping structure is a key-value data structure allowing fast search of elements of the key-value data structure.

17. The server computing system of claim 14, wherein each document ID of the second set corresponds to a single record in the grouping structure, and wherein each record comprises a counter to track a number of the occurrences of the document ID in the second set.

18. The server computing system of claim 14, wherein the processing device to associate the resulting documents further comprises the processing device to order the resulting documents within the search results so that the resulting documents corresponding to the resulting documents IDs are next to one another.

19. The server computing system of claim 14, wherein the processing device to determine the resulting document IDs further comprises the processing device to disregard the document ID of the first set for which the at least one shingle was obtained.

20. The server computing system of claim 14, wherein the at least one shingle is obtained from a shingles data store generated as part of indexing of the corpus of documents.

21. The server computing system of claim 14, wherein the processing device to generate shingles records for the shingles in the shingles data store further comprises the processing device to:
- obtain an obtained document of the corpus of documents and a corresponding document ID of the document from a document repository;
- parse the obtained document to extract textual content;
- remove non-meaning words from the extracted textual content to generate resulting text;
- convert the resulting text to a normalized format;
- generate the shingles over the normalized format;
- for each of the generated shingles:
  - search the shingles data store for the generated shingle;
  - responsive to a record existing for the generated shingle in the shingles data store, add the corresponding document ID to the record; and
  - responsive to the generated shingle not existing in the shingles data store, generate a new record for the generated shingle in the shingles data store and add the corresponding document ID to the record; and
- attach the generated shingles to metadata of the document in the document repository.

22. The server computing system of claim 21, wherein the processing device to generate the shingles records occurs during at least one of indexing or re-indexing of the document in the document repository.

23. A non-transitory computer readable storage medium storing instructions that, when executed by a processing device of a client device, cause the processing device to:
- determine a first set of document identifiers (IDs) for a first set of documents of the corpus of documents, the first set of documents identified responsive to a search query;
- obtain at least one shingle corresponding to the first set of document IDs;
- identify a second set of document IDs corresponding to the obtained at least one shingle;
- group the second set of document IDs in a grouping data structure based on document IDs;
- determine resulting document IDs from the grouping data structure, wherein each resulting document ID from the resulting document IDs is determined based on a threshold number of occurrences; and
- associate resulting documents of the first set of documents that correspond to the resulting document IDs with one another in search results generated responsive to the search query to create a final search result to send to a user.

24. The non-transitory computer readable storage medium of claim 23, wherein the at least one shingle comprise contiguous subsequences of tokens in the documents.

25. The non-transitory computer readable storage medium of claim 23, wherein the grouping structure is a key-value data structure allowing fast search of elements of the key-value data structure.

26. The non-transitory computer readable storage medium of claim 23, wherein each document ID of the second set corresponds to a single record in the grouping structure, and wherein each record comprises a counter to track a number of the occurrences of the document ID in the second set.

27. The non-transitory computer readable storage medium of claim 23, wherein the processing device to associate the resulting documents further comprises the processing device to order the resulting documents within the search results so that the resulting documents corresponding to the resulting documents IDs are next to one another.

28. The non-transitory computer readable storage medium of claim 23, wherein the processing device is further to, responsive to one of the resulting document IDs not comprised in the first set of document IDs, provide a document corresponding to the one of the resulting document IDs as a suggested related document in the search results.

29. The non-transitory computer readable storage medium of claim 23, wherein the processing device to generate shingles records for the shingles in the shingles data store further comprises the processing device to:
- obtain an obtained document of the corpus of documents and a corresponding document ID of the document from a document repository;
- parse the obtained document to extract textual content;
- remove non-meaning words from the extracted textual content to generate resulting text;
- convert the resulting text to a normalized format;
- generate the shingles over the normalized format;
- for each of the generated shingles:
  - search the shingles data store for the generated shingle;
  - responsive to a record existing for the generated shingle in the shingles data store, add the corresponding document ID to the record; and
  - responsive to the generated shingle not existing in the shingles data store, generate a new record for the generated shingle in the shingles data store and add the corresponding document ID to the record; and
- attach the generated shingles to metadata of the document in the document repository.

30. The non-transitory computer readable storage medium of claim 29, wherein the processing device to generate the shingles records occurs during at least one of indexing or re-indexing of the document in the document repository.

* * * * *